(12) United States Patent
Stopa et al.

(10) Patent No.: US 11,775,842 B2
(45) Date of Patent: Oct. 3, 2023

(54) META-HEURISTICS BASED ON HEAT MAPS FOR SOFTWARE DISCOVERY

(71) Applicant: International Business Machines Corporation, Armonk, NY (US)

(72) Inventors: Tomasz Andrzej Stopa, Cracow (PL); Grzegorz Sawina, Cracow (PL); Marcin Labenski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 16/924,320

(22) Filed: Jul. 9, 2020

(65) Prior Publication Data
US 2022/0012599 A1   Jan. 13, 2022

(51) Int. Cl.
| | | |
|---|---|---|
| G06F 16/14 | (2019.01) | |
| G06N 5/01 | (2023.01) | |
| H04L 41/0853 | (2022.01) | |
| G06N 3/04 | (2023.01) | |
| G06N 3/08 | (2023.01) | |

(52) U.S. Cl.
CPC ............. *G06N 5/01* (2023.01); *G06F 16/148* (2019.01); *G06N 3/04* (2013.01); *G06N 3/08* (2013.01); *H04L 41/0853* (2013.01)

(58) Field of Classification Search
CPC ........ G06F 16/148; G06N 5/003; G06N 3/04; G06N 3/08; H04L 41/0853
See application file for complete search history.

(56) References Cited

U.S. PATENT DOCUMENTS

| | | | |
|---|---|---|---|
| 10,489,352 B2 | 11/2019 | Godowski et al. | |
| 2016/0006600 A1* | 1/2016 | Gocek | H04L 43/08 |
| | | | 709/224 |
| 2016/0026968 A1* | 1/2016 | Fan | G06Q 10/087 |
| | | | 707/769 |
| 2018/0060402 A1* | 3/2018 | Fabjanski | G06F 16/254 |
| 2018/0096042 A1 | 4/2018 | Kuzma et al. | |
| 2018/0321928 A1* | 11/2018 | Borthakur | G06F 21/105 |

(Continued)

FOREIGN PATENT DOCUMENTS

CN   104781810 B   * 11/2019   ............ G06F 16/113

OTHER PUBLICATIONS

Srinivas et al., "Efficient clustering approach using incremental and hierarchical clustering methods", Jul. 2010, The 2010 International Joint Conference on Neural Networks (IJCNN) (Year: 2010).*

(Continued)

*Primary Examiner* — Hosain T Alam
*Assistant Examiner* — Robert F May
(74) *Attorney, Agent, or Firm* — Daniel M. Yeates

(57) ABSTRACT

An initial software scan is performed to detect a set of software deployed on an endpoint. An ongoing scan of the endpoint is performed to map a set of file directories associated with each software within the set of software. Via the ongoing scan, a usage frequency for each mapped file directory is determined. A heat map is generated for each mapped file directory, according to usage frequency, using a randomized meta-heuristic. A request is received for a software discovery scan result. The software discovery scan, based on the heat map, is performed in response to the request. The result of the software discovery scan is provided to a user.

20 Claims, 7 Drawing Sheets

(56) References Cited

U.S. PATENT DOCUMENTS

2020/0076770 A1 3/2020 Biran et al.
2020/0089843 A1 3/2020 Flores et al.

OTHER PUBLICATIONS

Real-time scanning of software inventory, An IP.com Prior Art Database Technical Disclosure, IP.com No. IPCOM000225137D, IP.com Electronic Publication Date: Jan. 25, 2013, 3 pages.
"Software System and Implementation approach to integrate systems management tools and manage asset Information of PCs", An IP.com Prior Art Database Technical Disclosure, Original Publication Date: Dec. 15, 2003, IP.com No. IPCOM000020794D, 3 pages.
Mell et al., "The NIST Definition of Cloud Computing", Recommendations of the National Institute of Standards and Technology, Special Publication 800-145, Sep. 2011, 7 pages.

\* cited by examiner

META-HEURISTICS BASED ON HEAT MAPS FOR SOFTWARE DISCOVERY

BACKGROUND

The present disclosure relates generally to the field of software discovery, and more particularly to leveraging meta-heuristics and heat maps in software discovery.

Software Asset Management (SAM) tools have been used to track software inventory for various enterprises and large entities. As the accuracy of software identification increases for an SAM, the time involved in making the identification also increases.

Meta-heuristics includes algorithms that may provide a sufficiently good solution to an optimization problem, especially when there is limited information/input for definitively solving the optimization problem.

SUMMARY

Embodiments of the present disclosure include a method, computer program product, and system for software discovery.

An initial software scan is performed to detect a set of software deployed on an endpoint. An ongoing scan of the endpoint is performed to map a set of file directories associated with each software within the set of software. Via the ongoing scan, a usage frequency for each mapped file directory is determined. A heat map is generated for each mapped file directory, according to usage frequency, using a randomized meta-heuristic. A request is received for a software discovery scan result. The software discovery scan, based on the heat map, is performed in response to the request. The result of the software discovery scan is provided to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
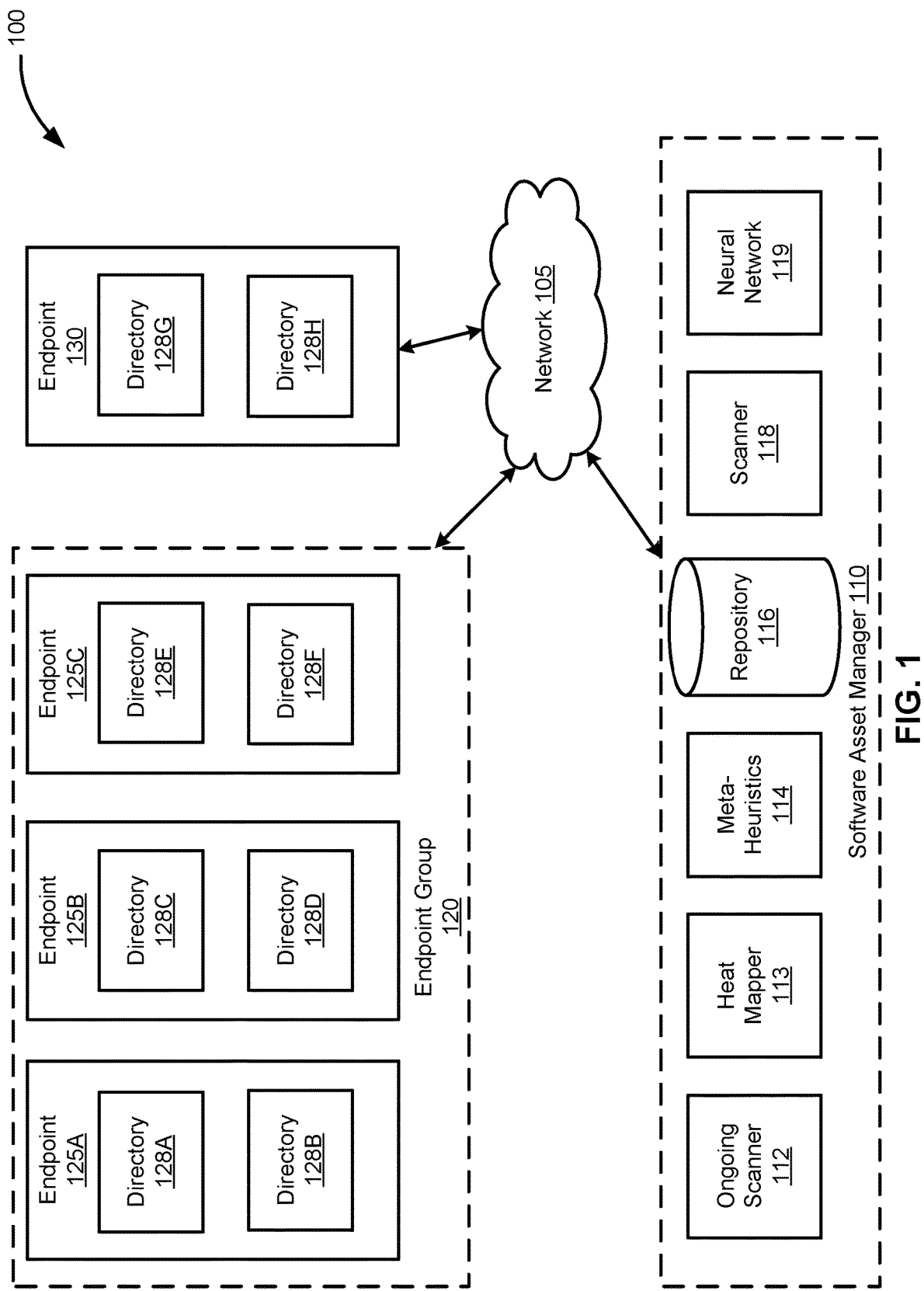
FIG. 1 illustrates a high-level diagram of an example computing environment for software discovery, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of software discovery, and more particularly to leveraging meta-heuristics and heat maps in software discovery. While the present disclosure is not necessarily limited to such applications, various aspects of the disclosure may be appreciated through a discussion of various examples using this context.

Software administrators may use SAM tools to quickly get a coarse view or approximation on the software inventory of an enterprise. As the accuracy of software inventory increases, so too does the amount of time needed to determine where the inventory resides, as well as what software is included in the inventory. Traditional SAM tools often rely on brute force scanning methods, which involves a great deal of computing resources to perform, and further creates a heavy footprint on any given endpoint being scanned (e.g., a target endpoint may be slow or unusable while being scanned).

Embodiments of the present disclosure contemplate the use of heat maps to inform the creation of a meta-heuristic algorithms which may be used to more quickly determine whether an inventory of software has been altered or changed in some way. The present disclosure discusses the use of constant/ongoing scans with minimal footprint to perform scans, and these minimal scans may be targeted according to the information gleaned from the heat maps and meta-heuristic algorithms to surgically identify and evaluate any changes in software inventory.

In some embodiments, a first software scan on a given endpoint or group of endpoints may be performed by scanning an initial set of the most common file locations for the desired software (e.g., a default installation directory, directories named after the software application, etc.). This initial scan is quick and immediately provides the user/administrator with a rough estimation of the software deployed on the endpoint(s).

A subsequent, ongoing scan may then be initiated to scan the remainder of the file system for the endpoint(s) The frequency of scanning "sweeps" may be limited or configured to minimize interference with other programs accessing the same file directories. Changes to the files and/or file directories may be monitored to determine software changes (e.g., updates, patches, migration, installation, uninstallation, etc.) In some embodiments, the path that the ongoing scan uses to traverse the file system may observe a meta-heuristic algorithm (e.g., a simulated annealing technique or other meta-heuristic).

In some embodiments, simulated annealing may refer to a path optimization method (i.e., wandering salesman problem) to minimize the "distance" traveled when multiple waypoints must be visited. The "distance" may be physical (e.g., physical distance between two storage blocks on a hard drive or solid state drive, the physical distance between two storage devices making up a single cloud storage drive, etc.), logical (e.g., files for a particular program vs files for a second program, system files vs application files, etc.), etc.

Waypoints may include file directories or locations generally, or they may, in some embodiments, refer to monitored changes in the file system (e.g., software changes).

In contrast to traditional SAM tools, embodiments of the present disclosure contemplate alternatives to binary scanning (e.g., full scan vs. no scan) and periodic scanning (e.g., fixed scan timeframes). According to embodiments, ongoing scans may be constant, yet minimal, thereby assuring a small resource footprint and minimal interference/intrusion into the target endpoint's normal operations.

In some embodiments, the longer the ongoing scan is active, the less scanning is actually performed, because the meta-heuristic algorithm will fine-tune the scanning to be less active in file directories/areas where little to no change has occurred or is anticipated (e.g., by generating a heat map for software changes). In this way, and in contrast to traditional SAM tools, computing resources may be preserved and utilized more judiciously, avoiding a situation where time/resource consumption is linearly related to scan accuracy.

In some embodiments, the entire SAM system may approach a fixed state in which scans occur in predictable file directories and at predictable intervals, but with a given amount of random sampling to monitor for spontaneous and/or unpredicted software changes. In some embodiments, when such a spontaneous change or anomaly is detected, the system may readjust the meta-heuristic algorithm to include more randomized sampling and/or simulated annealing techniques.

In some embodiments, the "heat" of the heat map may take into consideration various factors, such as frequency of application use, the number of applications installed, amount of time a particular application is used, the number of changes within a particular program, the number of total changes for the entire software inventory of an endpoint or endpoint group, etc. According to embodiments, each factor may be weighted, and the weighting may be dynamic to account for changes among users, programs, enterprises, computing hardware, etc.

In some embodiments, when a software administrator requests a scan after the contemplated system has been deployed and established, a quick rescan of the most critical file directories (e.g., the "hottest" areas on the heat map) may be performed, merged with data from the most recent sweep of "cold" areas from the ongoing scan, and presented to the administrator.

Referring now to FIG. 1, illustrated is a high-level diagram of an example computing environment 100 for software discovery, in accordance with embodiments of the present disclosure. Example computing environment 100 may be implemented as one or more physical devices (e.g., desktop computers, smart phones, tablets, etc.) communicatively coupled to each other (or even potentially a single standalone system), or it may be implemented in some degree using a cloud computing environment where one or more components of the environment are virtualized and run on a set of remote devices operating to sustain the virtualized components via one or more hypervisors (e.g., communicatively coupled using network 105). In any of these embodiments, data may be transferred using a physical or wireless network of any suitable configuration and using any suitable communications protocol(s). In some embodiments, encryption may be employed to secure the communications and maintain privacy.

Network 105 may include any suitable configuration for wired or wireless communications among computing devices and may operate using any suitable communications protocol. In some embodiments, network 105 may include security measures, such as end-to-end encryption, secure gateways, firewalls, etc.

In some embodiments, example computing environment 100 may include one or more endpoints 125A-C (collectively endpoint group 120) and 130, a network 105, and a software asset manager 110. In some embodiments, endpoints 125A-C and 130 may include, for example, a smartphone, tablet, desktop computer, etc. communicably coupled to software asset manager 110, either directly (e.g., ethernet, coaxial, hardwire, etc.) or via network 105. In some embodiments, endpoints 125A-C and 130 may be incorporated into separate standalone devices, or they may be virtualized devices residing on one or more hypervisors. In some embodiments, an endpoint group 120 may include a user or enterprise account or inventory of software, and the endpoints 125A-C and 130 may represent individual devices and/or user accounts across one or more devices. In some embodiments, a single user account may have access to multiple endpoints (e.g., a single user account spanning a smartphone, tablet, and desktop).

Endpoints 125A-C and 130 may include file storage, such as directories 128A-H. directories 128A-H may include any suitable type of storage (e.g., hard disk drive, solid state drive, cloud storage, etc.) and may be long-term storage or short-term storage (e.g., memory cache). Directories 128A-H may include software (e.g., applications and associated files) for which software asset manager 110 is responsible.

Software asset manager 110 may be responsible for determining and managing software inventory on the endpoints 125A-C and 130. The depicted components of software asset manager 110 are for purposes of demonstration—some embodiments may include more or fewer components, and some components may be combined. The depiction should not be read to limit the disclosure in any way.

Software asset manager 110 may include ongoing scanner 112, heat mapper 113, meta-heuristics 114, repository 116, scanner 118, and neural network 119. Scanner 118 may perform an initial scan, as discussed herein. The initial scan may be quick and immediately provides the user/administrator with a rough estimation of the software deployed on the endpoint(s) 125A-C and/or 130. Results from the initial scan may be stored in repository 116. In some embodiments, scanner 118 may further perform a scan in response to an administrator/user request using a heat map generated by heat mapper 113.

Repository 116 may include a virtual or physical storage device, and may rely on read only memory (e.g., long-term storage) or random access memory (e.g., short-term storage) to store the results, as well as the heat map and used meta-heuristics for each endpoint 125A-C and 130. In some embodiments, the heat map and used meta-heuristics may be stored locally to their respective endpoints 125A-c and 130.

Ongoing scanner 112 may provide ongoing, minimal footprint scans of any or all of directories 128A-H to map the file directories 128A-H on endpoints 125A-C and/or 130. Ongoing scanner may determine which location or directory to scan according to a randomized meta-heuristic algorithm from meta-heuristics 114.

Meta-heuristics 114 may include a library of meta-heuristic algorithms for determining which of directories 128A-H to scan, when to scan, and which files within directories 128A-H to scan. Meta-heuristics 114 may include, for example, tabu search, simulated annealing, variable neighborhood search, (adaptive) large neighborhood search, ant colony optimization, etc. In some embodiments, simulated annealing may be a preferred or default algorithm.

Heat mapper 113 may generate a heat map using data from ongoing scanner 112. For example, ongoing scanner 112 may monitor directories 128A-H for changes to files, applications, software inventory, etc. These changes, in addition to information regarding the frequency and type of change (e.g., installation/uninstallation, patch application, account creation/deletion, security updates, version changes, etc.) may factor into the determination and placement of "heat" on the heat map. In some embodiments, the heat map may further be used to select an appropriate meta-heuristic algorithm from meta-heuristics 114, or to adjust a particular algorithm to obtain a more optimal result.

In some embodiments, neural network 119 may aid in the generation of the heat map. Neural network 119 may ingest information from ongoing scanner 112 and output a determination of which heat map factors should be given more weight (e.g., how "hot" each factor should be during heat map generation). Neural network 119 may determine heat map factors in an ongoing "on-the-fly" manner, or it may do so at predetermined intervals, according to embodiments. In some embodiments, an additional neural network 119 may be used to evaluate the algorithms in meta-heuristics 114 and select a "best" algorithm. More detail regarding the operation of neural network 119 is discussed in regard to FIG. 4.

Figure 2:
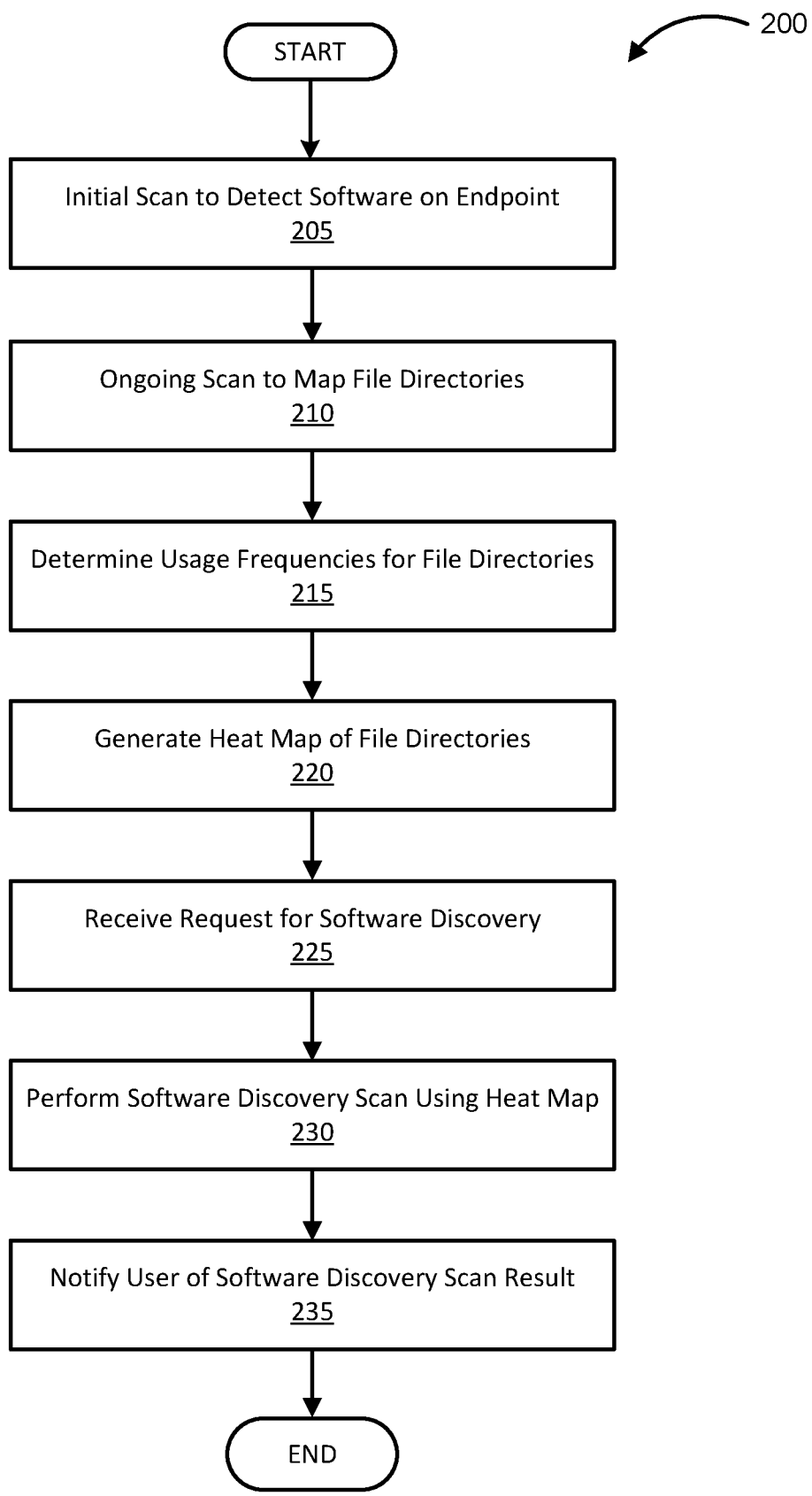
FIG. 2 illustrates a flowchart of a method for software discovery, in accordance with embodiments of the present disclosure.

Referring now to FIG. 2, illustrated is a flowchart of a method 200 for software discovery, in accordance with embodiments of the present disclosure. Method 200 may begin at 205, where an initial scan is performed to detect the software on an endpoint. This may include a quick scan to evaluate the number and type of applications on a particular endpoint or for a number of endpoints within an endpoint group.

At 210, an ongoing scan is deployed to map the file directories of the endpoint(s). In addition to mapping the directories, the ongoing scan may monitor the directories for any changes in their contents or files, as discussed herein. In some embodiments, a randomized meta-heuristic algorithm may be employed to determine which directory/file to scan next.

At 215, usage frequencies for the directories are determined. In some embodiments, usage frequencies may be determined at the application, directory, or file level. Usage frequencies may take into account the number, type, time, etc. of a file access or modification operation.

At 220, a heat map is generated for the file directories. In some embodiments, the "heat" of the heat map may consider factors such as usage frequencies and the type of each usage (e.g., installation/uninstallation, patch application, account creation/deletion, security updates, version changes, etc.), as described herein. In some embodiments, the heat map may be dynamically refined in an ongoing manner using a meta-heuristic algorithm and the heat map itself to determine which "hot" file directories/locations may be most likely to have changed.

At 225, a request for a software discovery scan may be received. In some embodiments, the request may be initiated by a user or administrator, or it may be according to a predetermined schedule.

At 230, a software discovery scan is performed, using the heat map. In some embodiments, the software discovery scan may scan a limited number of file directories/locations, determined by the "hot spots" of the heat map. The more-current result of the "hot spot" scan may be combined with less recent information for the "cold spots" to generate a software discovery scan result that is both accurate and time and resource-preserving.

At 235, the user or administrator is notified of the software discovery scan result. In some embodiments, the notification may be immediate (e.g., pop up notification) and/or comprehensive (e.g., combined with historical software discovery scan results).

Figure 3:
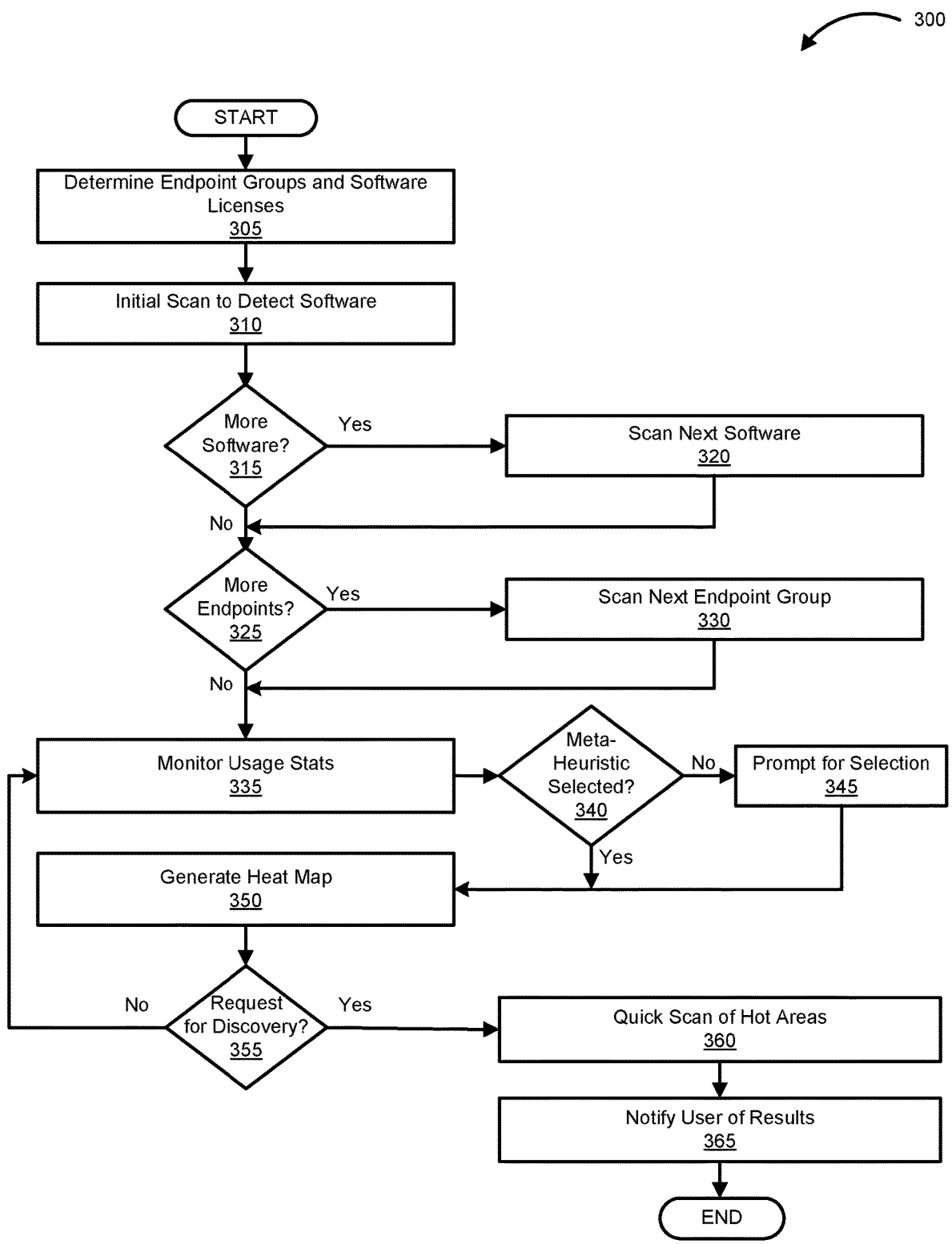
FIG. 3 illustrates a flowchart of an alternative method for software discovery, in accordance with embodiments of the present disclosure.

Referring now to FIG. 3, illustrated is a flowchart of an alternative method 300 for software discovery, in accordance with embodiments of the present disclosure. Method 300 may begin at 305, where a determination of endpoint groups and software licenses is executed. For example, endpoint group 120 (e.g., a collection of endpoints 125A-C) and/or endpoint 130 may be designated as target endpoints for method 300. A list of target software applications to search for may, in some embodiments, be determined. In some embodiments, a general software scan may be contemplated, or a targeted scan may be contemplated. In yet other embodiments, a hybrid approach may be contemplated where a general scan is performed, and file directories/locations with target applications may be weighted and assigned a weighted degree of "heat" on a heat map.

At 310, an initial scan to detect software is performed. The initial scan may, in some embodiments, be a more thorough or full scan, or it may be a quick scan simply to approximate the number and type of applications/software on an endpoint.

At 315, it may be determined whether there is additional software to scan. This determination may include an evaluation of the endpoint(s) to determine whether there is additional software on the endpoint(s), it may include a determination that other software licenses determined at 305 should be searched for, or both.

If, at 315, it is determined there is additional software to scan for, the additional software is scanned at 320. If, however, at 315, it is determined there is no additional software, the method proceeds to 325.

At 325, it is determined whether there are additional endpoints to scan. If, at 325, there is/are additional endpoint(s) to scan, the next endpoint or endpoint group is scanned at 330. If, however, it is determined at 325 that no additional endpoint(s) remain, the method proceeds to 335.

At 335, usage statistics for the file directories (e.g., directories 128A-H) are monitored using an ongoing scan, as discussed herein. Statistics may be stored in a repository (e.g., repository 116) and, in some embodiments, the statistics may be cross-referenced to include metadata regarding usage type or other heat map factors, as discussed herein.

At 340, it is determined whether a meta-heuristic algorithm has been selected. If no meta-heuristic has been selected at 340, a user/administrator may, in some embodiments, be prompted for a selection at 345. However, in some embodiments, a meta-heuristic selection may be automated or implemented using a neural network to evaluate which meta-heuristic algorithm may be optimal (e.g., meta-heuristic selection is YES at 340).

At 350, a heat map is generated using the usage statistics and the meta-heuristic algorithm. For example, the meta-heuristic algorithm may be used to direct the traverse path of the ongoing scan across file directories to generate dynamic and current usage statistics. The usage statistics may be used to generate a heat map reflecting which file directories experience the most use and/or file changes, what type of use and file changes are happening, etc. In some embodiments, a neural network may be employed to generate the heat map and/or to weight the heat map factors and usage statistics. In some embodiments, the heat map may be dynamic and heuristically current/accurate without the need for a full, large footprint scan.

At 355, it is determined whether a request for a software discovery scan has been received. If no request has been received, the method may proceed back to 335, where additional usage statistics may be gathered via an ongoing scan directed by the meta-heuristic algorithm. If, however, a request for software discovery has been received, the method may proceed to 360.

At 360, a quick scan of "hot spots" on the heat map may be performed to produce a report regarding the software inventory of the file directories that experience the most activity/usage. In some embodiments, this report may be combined with "older" information regarding the "cold spots" on the heat map (e.g., file directories that are not expected to have changed).

At 365, a user (or administrator) may be notified of the software discovery scan results. In some embodiments, this may include a comprehensive report regarding the entire heat map, or it may be limited to a report regarding a subset of the heat map (e.g., showing results for "spots" with 40% or greater chance of having a change in software since the last software discovery report).

Figure 4:
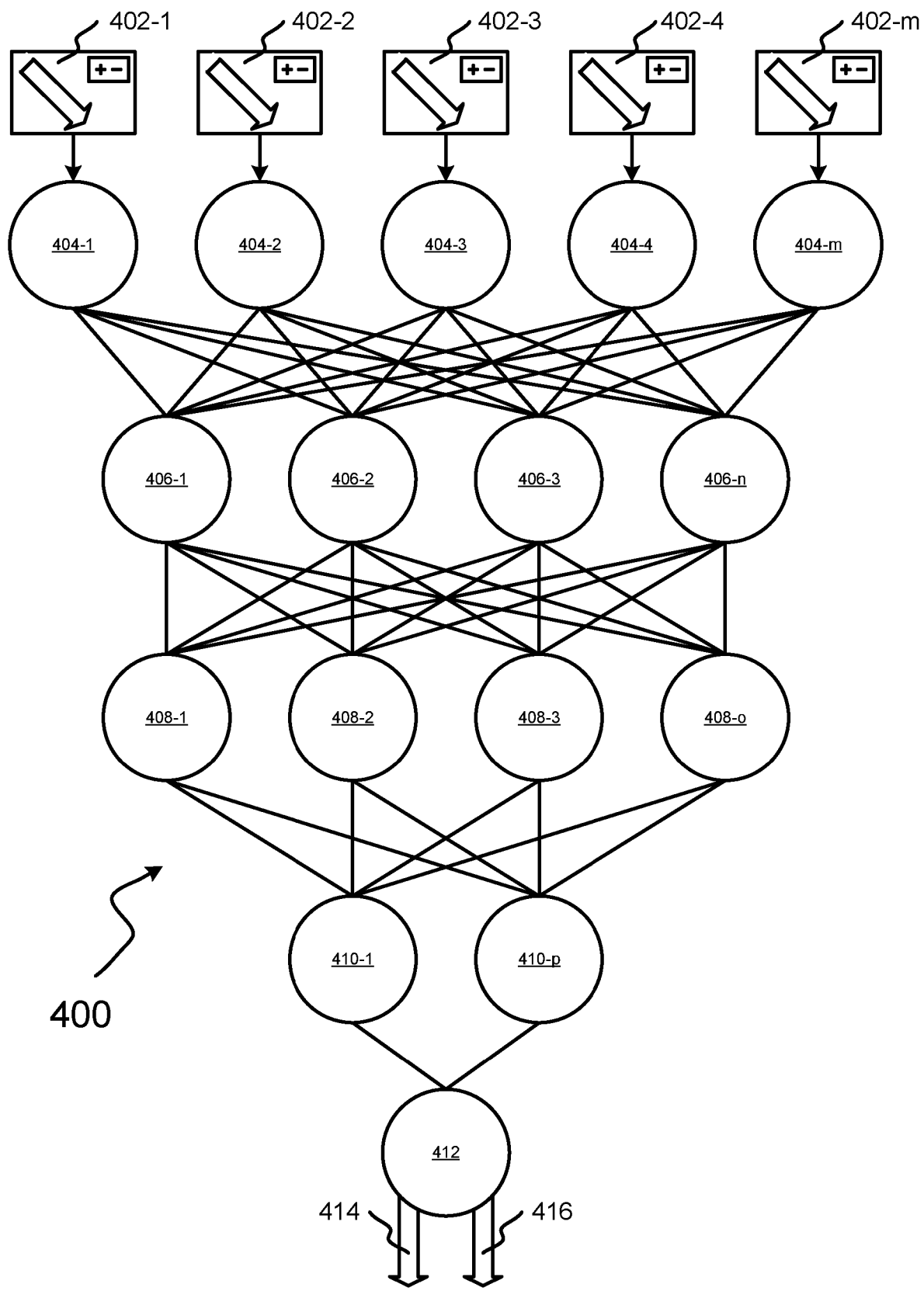
FIG. 4 illustrates an example neural network that may be used to perform meta-heuristics and generate heat maps, in accordance with embodiments of the present disclosure.

FIG. 4 depicts an example neural network 400 that may be used to perform meta-heuristics and generate heat maps, in accordance with embodiments of the present disclosure. The example neural network 400 may be implemented in a software asset manager (e.g., software asset manager 110), in some embodiments. In some embodiments, parallel techniques (e.g., Single Instruction Multiple Data (SIMD) techniques) may be employed to concurrently generate heat maps or to concurrently select meta-heuristics for multiple endpoints.

In embodiments, neural network 400 may be a classifier-type neural network. Neural network 400 may be part of a larger neural network (e.g., may be a sub-unit of a larger neural network). For example, neural network 400 may be nested within a single, larger neural network, connected to several other neural networks, or connected to several other neural networks as part of an overall aggregate neural network.

Inputs 402-1 through 402-$m$ represent the inputs to neural network 400. In this embodiment, 402-1 through 402-$m$ do not represent different inputs. Rather, 402-1 through 402-$m$ represent the same input that is sent to each first-layer neuron (neurons 404-1 through 404-$m$) in neural network 400. In some embodiments, the number of inputs 402-1 through 402-$m$ (i.e., the number represented by m) may equal (and thus be determined by) the number of first-layer neurons in the network. In other embodiments, neural network 400 may incorporate 1 or more bias neurons in the first layer, in which case the number of inputs 402-1 through 402-$m$ may equal the number of first-layer neurons in the network minus the number of first-layer bias neurons. In some embodiments, a single input (e.g., input 402-1) may be input into the neural network. In such an embodiment, the first layer of the neural network may comprise a single neuron, which may propagate the input to the second layer of neurons.

Inputs 402-1 through 402-$m$ may comprise one or more samples of classifiable data. For example, inputs 402-1 through 402-$m$ may comprise 10 samples of classifiable data. In other embodiments, not all samples of classifiable data may be input into neural network 400.

Neural network 400 may comprise 5 layers of neurons (referred to as layers 404, 406, 408, 410, and 412, respectively corresponding to illustrated nodes 404-1 to 404-$m$, nodes 406-1 to 406-$n$, nodes 408-1 to 408-$o$, nodes 410-1 to 410-$p$, and node 412). In some embodiments, neural network 400 may have more than 5 layers or fewer than 5 layers. These 5 layers may each be comprised of the same number of neurons as any other layer, more neurons than any other layer, fewer neurons than any other layer, or more neurons than some layers and fewer neurons than other layers. In this embodiment, layer 412 is treated as the output layer. Layer 412 outputs a probability that a target event will occur and contains only one neuron (neuron 412). In other embodiments, layer 412 may contain more than 1 neuron. In this illustration no bias neurons are shown in neural network 400. However, in some embodiments each layer in neural network 400 may contain one or more bias neurons.

Layers 404-412 may each comprise an activation function. The activation function utilized may be, for example, a rectified linear unit (ReLU) function, a SoftPlus function, a Soft step function, or others. Each layer may use the same activation function, but may also transform the input or output of the layer independently of or dependent upon the activation function. For example, layer 404 may be a "dropout" layer, which may process the input of the previous layer (here, the inputs) with some neurons removed from processing. This may help to average the data and can prevent overspecialization of a neural network to one set of data or several sets of similar data. Dropout layers may also help to prepare the data for "dense" layers. Layer 406, for example, may be a dense layer. In this example, the dense layer may process and reduce the dimensions of the feature vector (e.g., the vector portion of inputs 402-1 through 402-$m$) to eliminate data that is not contributing to the prediction. As a further example, layer 408 may be a "batch normalization" layer. Batch normalization may be used to normalize the outputs of the batch-normalization layer to accelerate learning in the neural network. Layer 410 may be any of a dropout, hidden, or batch-normalization layer. Note that these layers are examples. In other embodiments, any of layers 404 through 410 may be any of dropout, hidden, or batch-normalization layers. This is also true in embodiments with more layers than are illustrated here, or fewer layers.

Layer 412 is the output layer. In this embodiment, neuron 412 produces outputs 414 and 416. Outputs 414 and 416 represent complementary probabilities that a target event will or will not occur. For example, output 414 may represent the probability that a target event will occur, and output 416 may represent the probability that a target event will not occur. In some embodiments, outputs 414 and 416 may each be between 0.0 and 1.0, and may add up to 1.0. In such embodiments, a probability of 1.0 may represent a projected absolute certainty (e.g., if output 414 were 1.0, the projected chance that the target event would occur would be 100%, whereas if output 416 were 1.0, the projected chance that the target event would not occur would be 100%).

In embodiments, FIG. 4 illustrates an example probability-generator neural network with one pattern-recognizer pathway (e.g., a pathway of neurons that processes one set of inputs and analyzes those inputs based on recognized patterns and produces one set of outputs). However, some embodiments may incorporate a probability-generator neural network that may comprise multiple pattern-recognizer pathways and multiple sets of inputs. In some of these embodiments, the multiple pattern-recognizer pathways may be separate throughout the first several layers of neurons, but may merge with another pattern-recognizer pathway after several layers. In such embodiments, the multiple inputs may merge as well. This merger may increase the ability to identify correlations in the patterns identified among different inputs, as well as eliminate data that does not appear to be relevant.

In embodiments, neural network 300 may be trained/adjusted (e.g., biases and weights among nodes may be calibrated) by inputting feedback and/or input to correct/force the neural network to arrive at an expected output. In some embodiments, the feedback may be forced selectively to particular nodes and/or sub-units of the neural network. In some embodiments, the impact of the feedback on the weights and biases may lessen over time, in order to correct for inconsistencies among user(s) and/or datasets. In embodiments, the degradation of the impact may be implemented using a half-life (e.g., the impact degrades by 50% for every time interval of X that has passed) or similar model (e.g., a quarter-life, three-quarter-life, etc.).

It is to be understood that although this disclosure includes a detailed description on cloud computing, implementation of the teachings recited herein are not limited to a cloud computing environment. Rather, some embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
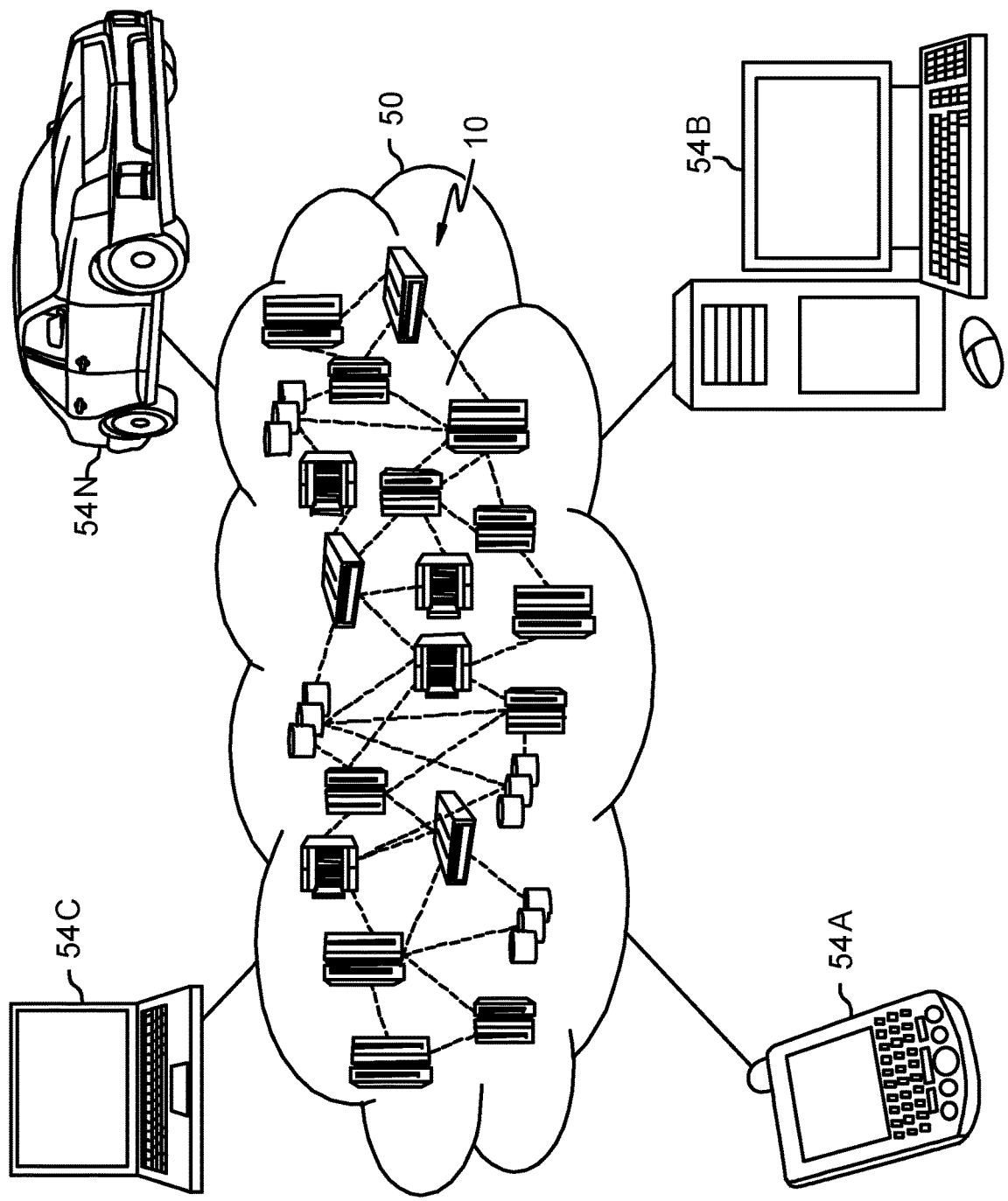
FIG. 5 depicts a cloud computing environment according to an embodiment of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
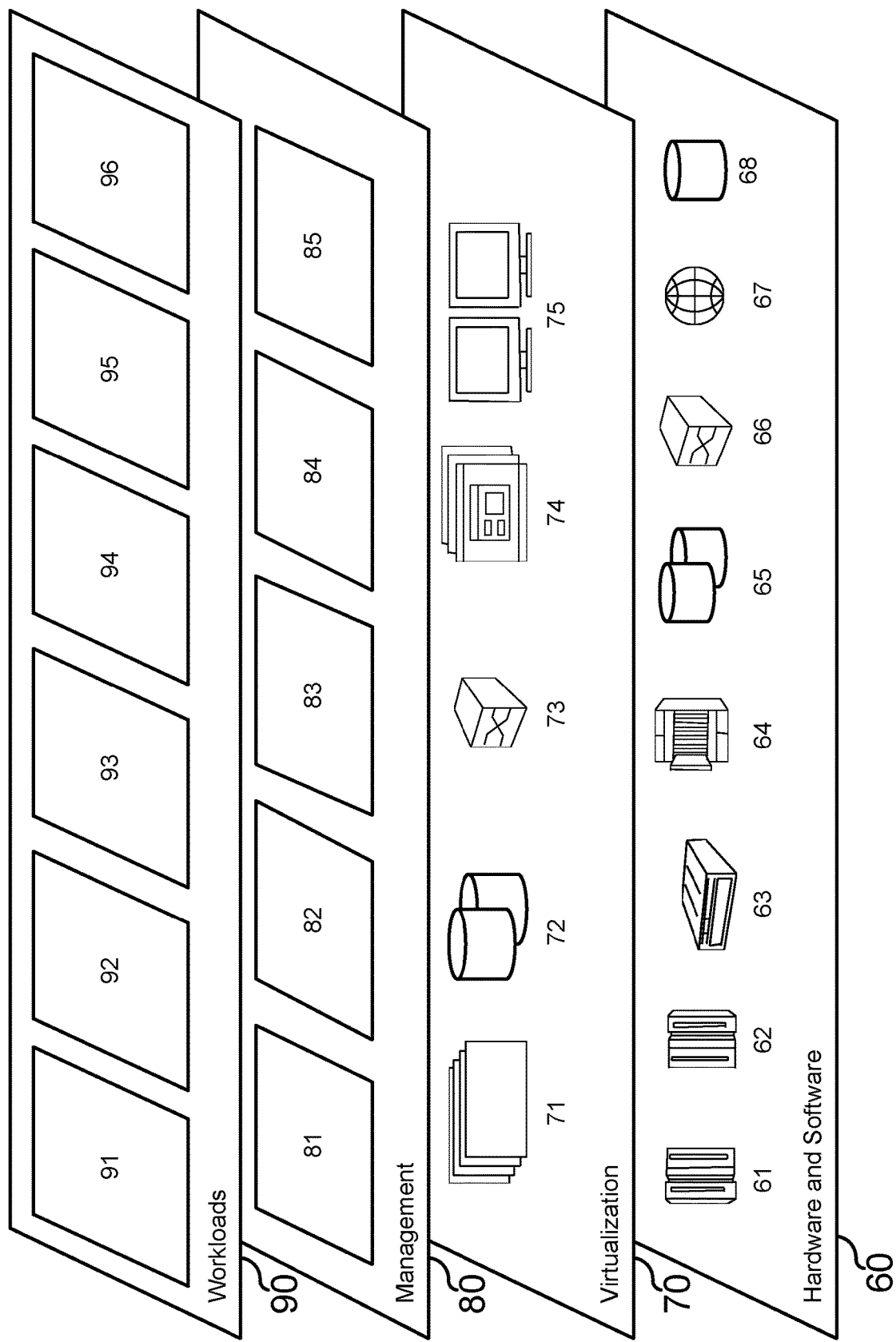
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and some embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software discovery 96.

Figure 7:
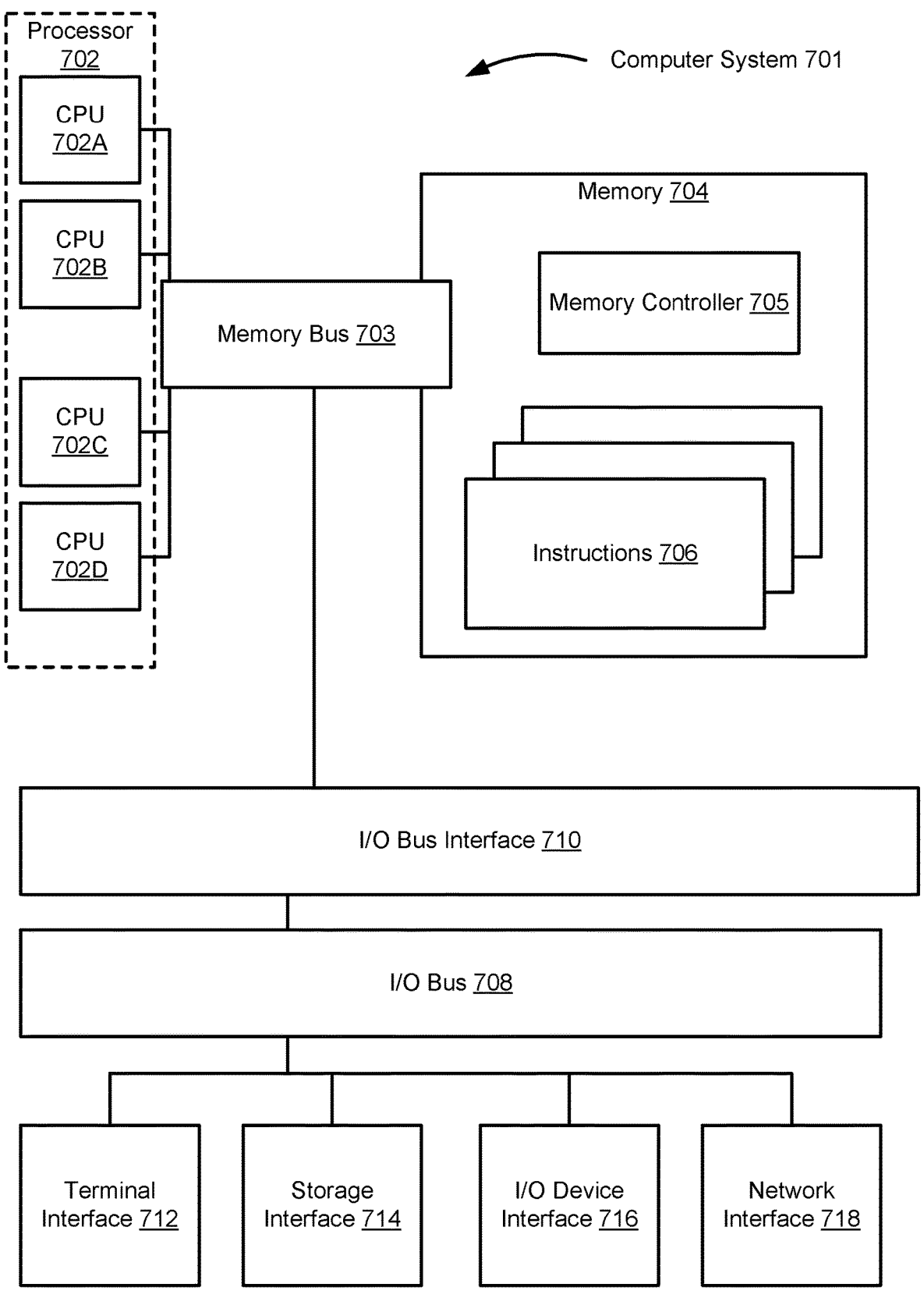
FIG. 7 depicts a high-level block diagram of an example computer system that may be used in implementing embodiments of the present disclosure.

Referring now to FIG. 7, shown is a high-level block diagram of an example computer system 701 that may be configured to perform various aspects of the present disclosure, including, for example, methods 200/300, described in FIGS. 2-3. The example computer system 701 may be used in implementing one or more of the methods or modules, and any related functions or operations, described herein (e.g., using one or more processor circuits or computer processors of the computer), in accordance with embodiments of the present disclosure. In some embodiments, the illustrative components of the computer system 701 comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may comprise one or more levels of on-board cache. Memory subsystem 704 may include instructions 706 which, when executed by processor 702, cause processor 702 to perform some or all of the functionality described above with respect to FIGS. 1-6.

In some embodiments, the memory subsystem 704 may comprise a random-access semiconductor memory, storage device, or storage medium (either volatile or non-volatile) for storing data and programs. In some embodiments, the memory subsystem 704 may represent the entire virtual memory of the computer system 701, and may also include the virtual memory of other computer systems coupled to the computer system 701 or connected via a network. The memory subsystem 704 may be conceptually a single monolithic entity, but, in some embodiments, the memory subsystem 704 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 704 may contain elements for control and flow of memory used by the CPU 702. This may include a memory controller 705.

Although the memory bus 703 is shown in FIG. 7 as a single bus structure providing a direct communication path among the CPUs 702, the memory subsystem 704, and the I/O bus interface 710, the memory bus 703 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative example components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for software discovery, the method comprising:
   performing an initial software scan to detect a set of software deployed on an endpoint;
   performing an ongoing scan of the endpoint to map a set of file directories associated with each software within the set of software;
   determining, via the ongoing scan, a usage frequency for each mapped file directory;
   generating a heat map for each mapped file directory, according to the usage frequency, using a randomized meta-heuristic;
   receiving a request for a software discovery scan result;
   performing, in response to the request, a software discovery scan based on the heat map, wherein the software discovery scan comprises performing a new scan of only one or more hotspots on the heatmap and combining the new scan with a most recent scan of each non-hotspot file directory, a hotspot is a file directory with a likelihood of change is above predetermined threshold, and the likelihood of change is determined from a previous scan; and
   providing the software discovery scan result to a user.

2. The method of claim 1, wherein the ongoing scan further comprises updating the heat map according to randomized sampling of the set of file directories.

3. The method of claim 2, wherein the randomized sampling is performed according to the randomized meta-heuristic.

4. The method of claim 3, wherein the randomized meta-heuristic includes a simulated annealing algorithm for determining a logical distance between two accessed files.

5. The method of claim 4, wherein the two accessed files are a first file and a second, subsequently accessed, file.

6. The method of claim 4, wherein the simulated annealing algorithm is performed using a neural network, and wherein the neural network is trained by at least adjusting a weight or bias of the neural network.

7. The method of claim 6, wherein the neural network is provisioned using a cloud computing environment.

8. A computer program product for software discovery, the computer program product comprising a computer readable storage medium having program instructions embodied therewith, the program instructions executable by a device to cause the device to:
   perform an initial software scan to detect a set of software deployed on an endpoint;
   perform an ongoing scan of the endpoint to map a set of file directories associated with each software within the set of software;
   determine, via the ongoing scan, a usage frequency for each mapped file directory;
   generate a heat map for each mapped file directory, according to the usage frequency, using a randomized meta-heuristic;
   receive a request for a software discovery scan result;
   perform, in response to the request, a software discovery scan based on the heat map, wherein the software discovery scan comprises performing a new scan of only one or more hotspots on the heatmap and combining the new scan with a most recent scan of each non-hotspot file directory, a hotspot is a file directory with a likelihood of change is above predetermined threshold, and the likelihood of change is determined from a previous scan; and
   provide the software discovery scan result to a user.

9. The computer program product of claim 8, wherein the ongoing scan further comprises updating the heat map according to randomized sampling of the set of file directories.

10. The computer program product of claim 9, wherein the randomized sampling is performed according to the randomized meta-heuristic.

11. The computer program product of claim 10, wherein the randomized meta-heuristic includes a simulated annealing algorithm for determining a logical distance between two accessed files.

12. The computer program product of claim 11, wherein the two accessed files are first file and a second, subsequently accessed, file.

13. The computer program product of claim 11, wherein the simulated annealing algorithm is performed using a neural network, and wherein the neural network is trained by at least adjusting a weight or bias of the neural network.

14. The computer program product of claim 13, wherein the neural network is provisioned using a cloud computing environment.

15. A system for software discovery, comprising:
   a memory with program instructions included thereon; and
   a processor in communication with the memory, wherein the program instructions cause the processor to:
      perform an initial software scan to detect a set of software deployed on an endpoint;
      perform an ongoing scan of the endpoint to map a set of file directories associated with each software within the set of software, wherein the ongoing scan further comprises updating the heat map according to randomized sampling of the set of file directories, the randomized sampling is performed according to the randomized meta-heuristic, and the randomized meta-heuristic includes a simulated annealing algorithm for determining a logical distance between two accessed files;
      determine, via the ongoing scan, a usage frequency for each mapped file directory;
      generate a heat map for each mapped file directory, according to the usage frequency, using a randomized meta-heuristic;
      receive a request for a software discovery scan result;
      perform, in response to the request, a software discovery scan based on the heat map; and
      provide the software discovery scan result to a user.

16. The system of claim 15, wherein the two accessed files are a first file and a second, subsequently accessed, file.

17. The system of claim 16, wherein the simulated annealing algorithm is performed using a neural network, and wherein the neural network is trained by at least adjusting a weight or bias of the neural network.

18. The system of claim 15, wherein a hotspot is a file directory where a likelihood of change is above a predetermined threshold.

19. The system of claim 18, wherein the likelihood of change is determined from a previous scan.

20. The system of claim 19, wherein the previous scan is a previous software the initial software scan.

\* \* \* \* \*